United States Patent [19]

Binegar et al.

[11] 4,393,889
[45] Jul. 19, 1983

[54] FIRE-SAFE VALVE STRUCTURE

[75] Inventors: Scott W. Binegar; Hamid J. Saka, both of Houston, Tex.

[73] Assignee: ACF Industries, Incorporated, New York, N.Y.

[21] Appl. No.: 244,532

[22] Filed: Mar. 17, 1981

[51] Int. Cl.³ .............................................. F16K 13/04
[52] U.S. Cl. ........................................ 137/72; 137/74; 251/328
[58] Field of Search ................... 137/72, 74; 251/328; 220/89 B, 201, 202

[56] References Cited

U.S. PATENT DOCUMENTS

| | | | |
|---|---|---|---|
| 1,740,420 | 12/1929 | Friedman | 137/74 X |
| 1,876,938 | 9/1932 | Horne | 137/74 X |
| 2,047,654 | 7/1936 | Te Pas | 137/74 X |
| 3,177,887 | 4/1965 | Priese | 137/74 |
| 3,349,789 | 10/1967 | Crain | 251/328 X |
| 3,559,948 | 2/1971 | Grove | 251/328 X |
| 3,776,457 | 12/1973 | Cardi | 137/74 X |
| 4,139,005 | 2/1979 | Dickey | 220/89 B X |
| 4,160,460 | 7/1979 | Kemp | 137/72 |

Primary Examiner—Harold W. Weakley
Attorney, Agent, or Firm—Marvin J. Marnock

[57] ABSTRACT

A fire-safe valve structure for a valve of the type having a valve body with a flow passage (18, 20) therethrough and a valve chamber which houses a valve element (70) for opening and closing the flow passage, the valve chamber becoming sealed off from the flow passage in the open and closed conditions. An annular metallic seat (110) with a port (200), which extends between its inner and outer annular surfaces (186, 188) and so located as to communicate the valve chamber with the flow passage, is disposed in an annular seat pocket (28) formed around the flow passage (20) on the upstream side of the valve. The seat pocket (28) opens to the valve chamber (50) and the metallic seat (110) is provided with sealing means (196) for sealing with the valve element (70) in the open or closed condition. A relief plug (202) of a selected temperature degradable material is positioned within the port (200) so that when the chamber is sealed off and the plug (202) is exposed to the environment within the valve chamber (50), the plug (202) will evacuate the port (200) at the degradation temperature of the plug material or will be ejected from the port (200) at a preselected pressure differential between the valve chamber (50) and flow passage (20), whichever first occurs. The pressure build-up in the valve chamber (50) which results from rising temperature is then relieved by communication of the chamber through the port (200) to the upstream flow passage (20).

4 Claims, 5 Drawing Figures

FIRE-SAFE VALVE STRUCTURE

BACKGROUND OF THE INVENTION

The invention relates to a "fire-safe" valve structure which avoids dangerous pressure build-up in the valve chamber by establishing communication between the valve chamber and the flow passage through the valve when the environment in the valve chamber reaches a preselected temperature or a preselected pressure condition, and more specifically to a valve seat that provides communication between the valve chamber and the upstream flow passage in the event the environment within the valve chamber reaches a preselected condition as to temperature or pressure.

Valves in pipelines that carry petroleum products are susceptible to exposure to abnormally high temperatures in the event of a fire along the pipeline. It is essential to effective pipeline operation that the valve not be destroyed by such high temperatures. Oftentimes during a fire when the valve chamber is sealed off from the remainder of the valve in the closed or open condition of the valve the high temperatures create excessive pressure in the valve chamber. The result is the valve may be destroyed, most often, by a shearing of the bonnet bolts. Thus, it is highly desirable to provide an improved valve structure which can withstand abnormally high temperatures.

Heretofore, applicant is unaware of any valve or valve seat that provides a relief feature wherein the valve chamber is placed in communication with the flow passage through the valve when the environment within the valve chamber reaches a preselected temperature. While it has been known to provide valves with a by-pass between the chamber and flow passage at a preselected pressure differential, these conventionally employ check valves in the by-pass which lack reliability at high temperatures. They are also mounted externally of the valve in an exposed position.

SUMMARY OF THE INVENTION

It is therefore an object of the invention to provide an improved valve structure which enables the valve in operation to withstand abnormally high temperature situations.

It is another object to provide an improved valve structure which allows pressure within the valve chamber to be relieved by establishing communication between the valve chamber and flow passage when the environment in the chamber reaches a preselected temperature or a pressure level which exceeds the pressure in the flow passage through the valve by a preselected amount.

The invention is an improved valve structure having a relief plug therein which is designed and installed in a manner to be ejected and thereby establish fluid communication between the valve chamber and flow passage through the valve when the environment in the valve chamber reaches a preselected dangerous condition.

A specific embodiment of the invention is a valve seat positioned within an annular seat pocket surrounding a flow passage that communicates with a valve chamber formed in the valve body. The valve seat comprises an annular body member having inner and outer circumferential surfaces relative to the flow passage and having a port therein extending between the inner and outer circumferential surfaces. A relief plug of a selected material is positioned within the port so that the plug is exposed to the environment within the valve chamber, whereby when the material degrades at a preselected temperature or the pressure level in the valve chamber exceeds the pressure in the flow passage by a predetermined threshhold amount, the plug material evacuates the port into the flow passage and the pressure build-up in the valve chamber is relieved.

BRIEF DESCRIPTION OF THE DRAWINGS

Referring to FIG. 1, there is illustrated a gate valve 10 which incorporates a novel valve seat structure in an embodiment of the invention. The gate valve 10 includes a valve body 12 which has a body cavity 14 formed therein and inlet and outlet flow passages 20, 18 communicating with the valve body cavity 14. The valve body 12 is further provided with flanges 24 and 22 adjacent the inlet and outlet flow passages, respectively, and at the outer ends thereof to facilitate connection of the valve in a flowline.

Figure 1:
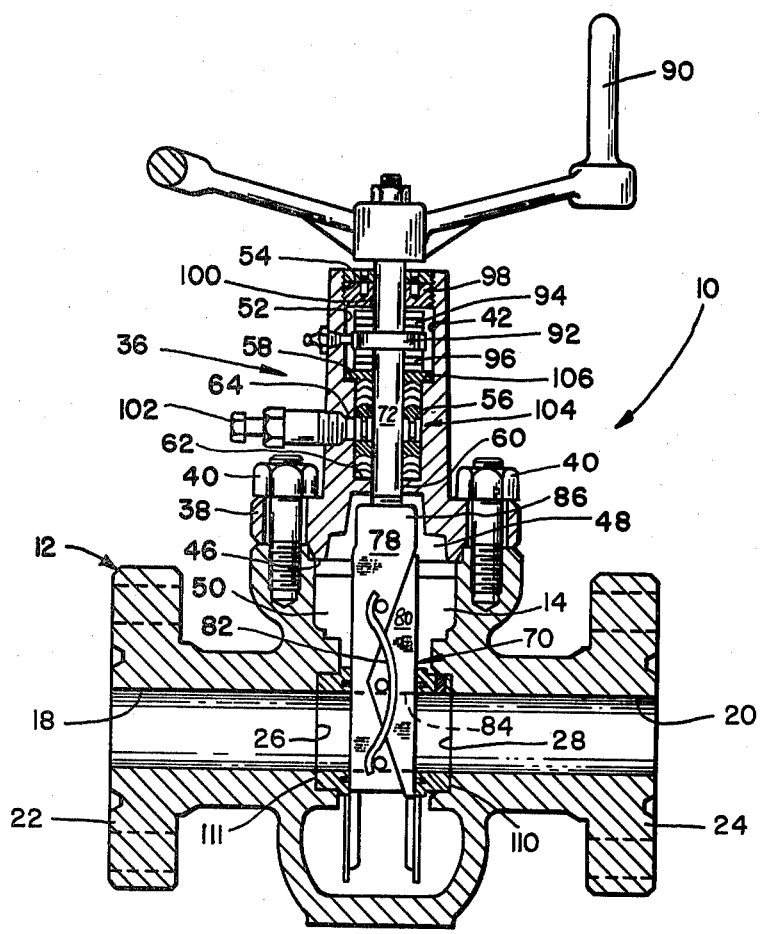
FIG. 1 is a plan view, a portion shown in section, of a nonrising stem type expanding gate valve which embodies the invention wherein a relief plug is provided in a valve seat of the valve body.

A bonnet assembly generally designated as 36 is connected via a lower flange 38 to the valve body 12 by a plurality of bolts 40. The bonnet assembly 36 has a bore 42 formed therethrough, the lower end 46 of which is shaped to define a bonnet cavity 48. The bonnet cavity 48 together with valve body cavity 14 define a valve chamber 50. At its upper end, bore 42 has an enlarged diameter portion 52 which is provided with internal threads 54 adjacent its upper end. The bore 42 further includes an intermediate diameter portion 56 located adjacent and axially inward of enlarged diameter bore portion 52 towards the valve chamber, thus providing the bore 42 with an annular upward facing shoulder 58. The bore 42 further includes a reduced diameter portion 60 extending from the bottom of the intermediate diameter bore portion 56 as defined by an upwardly facing annular shoulder 62 so as to communicate with the bonnet cavity 48. The bonnet assembly 36 is further provided with a threaded port 64 which extends laterally through the wall of the bonnet assembly 36 into communication with the intermediate bore portion 56. Threaded port 64 accommodates a lubricant fitting 102.

The gate valve 10 includes a gate assembly 70 positioned within the valve chamber 50 for reciprocal up and down movement between open and closed positions relative to the flow passages 18 and 20. The gate assembly 70 is moved by selective rotation of the valve stem 72 which extends from the gate assembly through the bonnet bore 42 and an opening 100 in a retainer 98 which is threadedly connected in the upper end of the bore 42. For this purpose, the valve stem 72 is provided at its upper end with a handle 90 and at its lower end is threaded so as to be received within the correspondingly threaded bore which is formed in an upwardly directed extension 86 of the gate member 78. The valve stem 72 is also provided with a collar 92 which is mediately disposed between upper and lower thrust bearings 94 and 96, respectively, contained within the enlarged diameter bore portion 52. Thus, upon rotation of the valve stem 72 the gate assembly 70 is moved up or down relative thereto and depending on the selected direction of rotation effects an opening or closing of the gate valve 10 as is desired.

A "fire-safe" stem packing arrangement generally designated 104 is positioned within the intermediate diameter bore portion 56 so as to be sandwiched between an upper barrier comprised of a packing retainer 106, which is seated on the bore shoulder 58, and a lower barrier provided by the annular bore shoulder 62. A preferred form of stem packing arrangement considered most suitable for use with the gate valve 10, is the subject of a patent application filed concurrently herewith and also assigned to ACF Industries, Incorporated.

The gate assembly 70 includes, in addition to the gate member 78, a segment 80 which is disposed adjacent the inlet flow passage 20. The gate member 78 is provided with a V-shaped recess which receives the V-shaped face of the segment 80 for cooperative engagement therewith. A pair of curved springs 82, only one of which is shown, engage pins on opposite sides of the gate 78 and segment 80 in a manner to continuously urge the gate 78 and segment 80 towards one another and therefore biasing the gate assembly toward a collapsed condition. As the valve handle 90 is turned to effect a selected upward or downward movement of the gate assembly 70, upper and lower stops place a limit to the upward and downward movement of the segment. The upper stop is the inside surface of the bonnet and the lower stop is the bottom of the valve chamber. Accordingly, with continuing movement of the gate member, there is a camming action from sliding contact between the co-engaging faces of the gate and segment which results in an expanded condition of the gate assembly when in its open position as seen in FIG. 1 and a similar expanded condition when the gate assembly is disposed towards the bottom of the valve chamber in the closed position. As is conventional, there is an opening 84 in the gate assembly formed by ports in the gate 78 and segment 80 which are in alignment with each other and the flow passages 18, 20 when the valve is in the open position. In addition, it is also to be noted the outwardly facing sides of the gate and segment are planar surfaces which continually remain parallel to one another and perpendicular to the flow passages for all positions of the gate assembly.

Upstream and downstream seat pockets 28 and 26 are formed in the valve body 12 about the inlet and outlet flow passages, respectively, adjacent to body cavity 14. Both pockets have a rear wall 30 facing inwardly toward valve body cavity 14 and a circumferential cylindrical annular wall 32 generally perpendicular to rear wall 30 and parallel to the longitudinal axis of the flow passages. A frusto-conical surface 187 is provided for the upstream seat pocket 28 adjacent the body cavity 14 as an extension from cylindrical wall 32.

Each of the upstream and downstream seat pockets 28 and 26 has a valve seat 110 and 11, respectively, positioned in a press fit relation therein. The upstream valve seat 110 is one embodiment of the invention and shown positioned in the seat pocket 28 in FIGS. 2 and 3, has an annular body 182 with an axial passage 184 therethrough corresponding with the inlet and outlet flow passages and disposed coaxial therewith. Annular body 182 has inner and outer cylindrical surfaces 186 and 188 that are generally parallel to and coaxial with the longitudinal axis of the flow passage, and front and rear planar surfaces 190 and 192 that are generally perpendicular to the circumferential surfaces 186 and 188. A radial flange 194 is formed at the front surface 190 of the annular body 182 and an annular face seal insert 196 is fit within an annular groove 198 formed in front surface 190. A relief port 200 is located between flange 194 and rear surface 192 and extends in a radial direction through annular body 182 so as to place inner and outer circumferential surfaces 186 and 188 in communication. A relief plug 202 of a selected material is fit within relief port 200. The material from which relief plug 202 is made is selected so that upon the environment within valve chamber 50 reaching a preselected condition as to temperature or pressure the relief plug 202 will evacuate the relief port 200 as will be described hereinafter. The material normally is installed in the relief port in its molten state and then allowed to cool to provide a very tight fit. Preferably, the material selected is one which expands when cooled to the solid state. Most often in operation, the plug will be ejected because it reaches its degradable temperature. On rare occasions, it will be ejected before reaching this temperature, if a preselected pressure differential is reached between the valve chamber and flow passage.

As previously mentioned, valve seat structure 110 provides for advantageous high temperature performance characteristics of the valve. In the event the environment the valve body reaches temperatures common to a fire condition, this excessive heat will create a relatively high pressure within the valve chamber (e.g. 13,000 psi). Generally, the pressure in the flow passage is relatively low (e.g. 3,000 psi) in comparison to the valve chamber pressure. However, a relatively great pressure differential (e.g. 10,000 psi) between the valve chamber and flow passage pressures tends to cause the seat to contract so as to create a space between the outer circumferential cylindrical seat surface 188 and the annular cylindrical surface 32 of the seat pocket. This space would then allow pressure from within the valve chamber to act upon the entire outer end of the relief plug. However, to insure that the outer end of the relief plug is exposed to the valve chamber fluid, port 200 should be located closely adjacent the seat flange 194, opposite the frusto-conical surface 187. Because relief plug 202 is made from a selected material that upon the environment within valve chamber 50 reaching a preselected temperature degrades, the combination of pressure and temperature forces relief plug 202 to evacuate port 200.

One exemplary material from which relief plug 202 is made is a eutectic material termed "CERROTRU" manufactured by Cerro Corporation, 300 Park Ave., New York, N.Y. According to the manufacturer's specifications, "CERROTRU" is an alloy of 58.0% bismuth and 42.0% tin. This eutectic material melts at approximately 281° F. (138° C.) so that upon the temperature within valve chamber 50 reaching approximately 281° F. (138° C.), the plug 202 is sufficiently weak so that the valve chamber pressure causes plug 202 to pass into the flow passage. Once plug 202 has evacuated port 200 any excessive pressure from within valve chamber 50 can be transmitted therefrom through port 200 into the flow passage.

Figure 2:
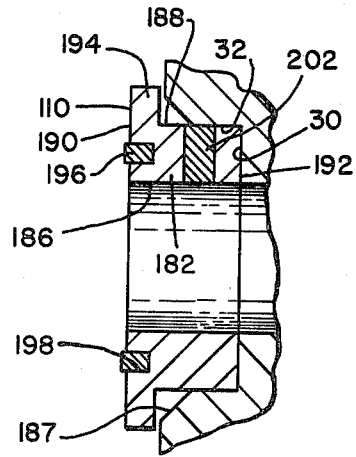
FIG. 2 is a sectional view of a first embodiment of an upstream valve seat structure utilized in the valve of FIG. 1 and in which the relief plug is in position within the relief port.
Figure 3:
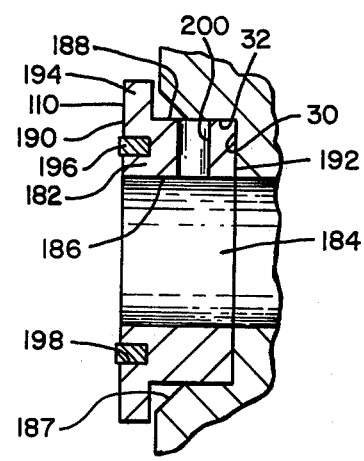
FIG. 3 is a view similar to that of FIG. 2, but with the relief plug evacuated from the relief port.
Figure 4:
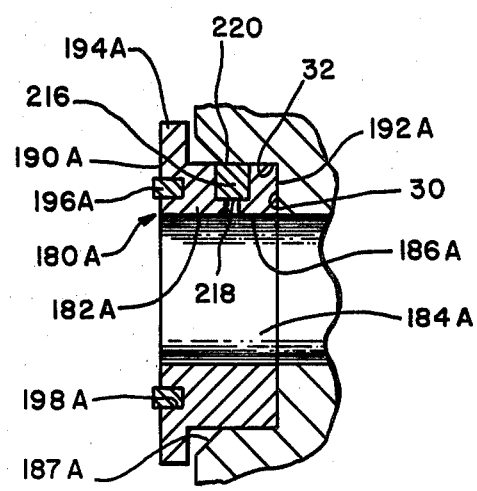
FIG. 4 is a sectional view of a second embodiment of an upstream valve seat for utilization in the valve shown in FIG. 1 and in which the relief plug is in position within the relief port.
Figure 5:
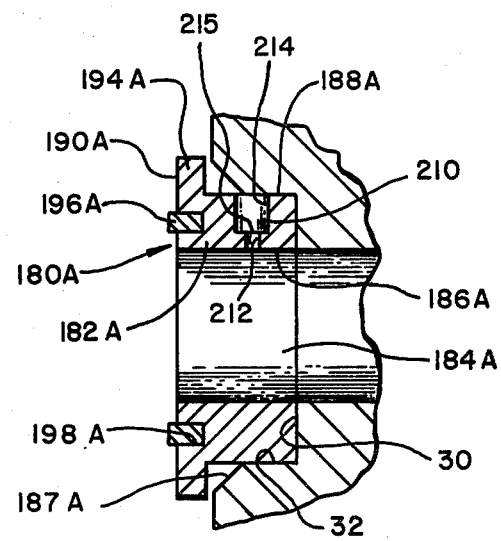
FIG. 5 is a view similar to that of FIG. 4 but with the relief plug evacuated from the relief port.

A second embodiment of the valve seat, generally similar to that of valve seat 110 except for the structure of the relief port, is preferred for application where the corrosive nature of fluids in the pipeline is such as to be harmful to the eutectic material in the plug of the embodiment in FIG. 2. In the description of this second embodiment, similar structural elements of the valve seat are generally identified by similar reference numerals as those in the first embodiment but followed by the letter "A". As shown in FIGS. 4 and 5, valve seat 180A has an annular body 182A with an axial passage 184A therethrough corresponding in diameter and cross section to those of the inlet and outlet flow passages. Annular body 182A has inner and outer circumferential cylindrical surfaces 186A and 188A that are generally parallel to and coaxial with the longitudinal axis of the flow passage, and front and rear planar surfaces 190A and 192A that are generally perpendicular to circumferential surfaces 186A and 188A. A radial flange 194A is formed at the front surface 190A of annular body 182A and an annular face seal insert 196A is fit within an annular groove 198A formed in front surface 190A. A relief port 210 is located between flange 194A and rear surface 192A and passes in a radial direction through annular body 182A and the inner and outer circumferential surfaces 186A and 188A. Relief port 210 includes a reduced diameter portion 212 adjacent inner circumferential surface 186A and an enlarged diameter portion 214 adjacent outer circumferential surface 188A. The reduced and enlarged diameter portions are joined by an outwardly facing annular shoulder 215.

A relief plug 216 of a selected degradable material such as tetrafluoroethylene is press fit within enlarged diameter portion 214. Relief plug 216 has opposite inner and outer ends 218 and 220. Inner end 218 of relief plug 216 rests on annular shoulder 215 within the relief port and outer end 220 of the plug is flush with outer circumferential surface 188A. In this position, whenever valve chamber fluid gets between the seat pocket wall 32 and the cylindrical seat surface 188A the outer end of the relief plug has more exposed surface area than the inner end of the relief plug. In operation, annular shoulder 215 supports relief plug 216 against premature evacuation by pressure from valve chamber 50. Since the plug is press fit in the relief port, the specific pressure differential acting on the plug to cause its ejection could not be determined with reasonable accuracy were it not for the shoulder 215. The specific differential pressure which ejects the plug is a function of plug and port dimensions and size of valve and can be controlled by design of the plug and/or port. However, the plug might also be ejected when it reaches a preselected temperature and degrades, thereby losing structural strength. This loss of strength in conjunction with pressure acting on outer end 220 causes relief plug 202 to pass from relief port 210 into the flow passage. High pressure fluid within valve chamber 50 is thus allowed to vent into the flow passage. In the event the valve chamber temperature does not reach the degradable temperature of the relief plug, the relief plug will not evacuate unless the pressure differential between the valve chamber and flow passage reaches a predetermined value, for example 7,000 psi. The particular material chosen for the relief plug will depend largely on the specific temperature at which it is to degrade. For example, a variety of tetrafluoroethylene, such as Teflon may be selected for the plug which degrades at 300° F. (149° C.).

The invention has been illustrated with respect to a non-rising stem gate valve, but it is to be understood, that it has equal applicability to rising stem gate valves. It is particularly useful in gate valves having expansible gate assemblies since in their normal operation the valve chamber is sealed off from the flow passage in the closed condition of the valve and when in its fully open condition. However, it is also applicable to any valves of the type having a valve chamber which is likely to be sealed off from the remainder of the valve. Also, the relief plug materials are selected as necessary so that degradation and evacuation of the plug will occur at a desired temperature of the valve chamber. The relief plug itself might also be located in another port of the valve, such as one in the valve body.

The foregoing description of the invention has been presented for purposes of illustration and explanation and is not intended to limit the invention to the precise form disclosed as changes in details of the illustrated construction may be made by those skilled in the art, within the scope of the appended claims, without departing from the spirit of the invention.

What is claimed is:

1. In an expanding gate valve having a valve body with a flow passage therethrough, a valve chamber in the body communicating with the flow passage, and an expanding gate assembly movably mounted in the valve chamber for opening and closing the flow passage, and wherein the valve chamber becomes sealed off from the flow passage in the open and closed conditions of the valve, means defining an annular recess in said valve body circumferentially surrounding the flow passage on the upstream side of said valve element and opening between said valve chamber and said flow passage, said recess having a rear wall extending from the flow passage generally radially thereof and a circumferential cylindrical wall extending substantially coaxially to the flow passage from the valve chamber to said rear wall, and sealing means adapted to sealingly engage the gate assembly in its opened and closed conditions whereby said valve chamber becomes sealed off from said flow passage; an improved valve structure comprising:

an annular metallic seat disposed in said annular recess, said annular seat having an inner annular cylindrical surface substantially coaxial to and facing said flow passage and an outer peripheral annular cylindrical surface substantially coaxial to said inner annular cylindrical surface and facing said recess circumferential wall, said annular seat having a port therein extending in a generally radial manner from the flow passage between said inner annular cylindrical surface and said outer peripheral annular cylindrical surface such that the outer end of the port is exposed to the interior of the valve chamber and the inner end of the port is exposed to said flow passage; and a relief plug of a selected temperature degradable material positioned in a plugging relationship within said port, said relief plug being exposed to both the fluid environment within said valve chamber on its outer end and said flow passage on its inner end whereby the valve chamber is sealed off from the flow passage during the open and closed conditions of the gate valve and said relief plug is caused to evacuate the port into the upstream flow passage upon the fluid environment in the valve chamber reaching a preselected temperature condition or when a preselected pressure differential exists between the valve chamber and flow passage.

2. The improved valve structure as set forth in claim 1 wherein said plug is of a eutectic material that melts upon reaching a preselected temperature.

3. The valve structure as set forth in claim 2 wherein said eutectic material is an alloy of 58.0% bismuth and 42.0% tin.

4. The valve structure of claim 1 wherein said port has an enlarged portion of enlarged transverse cross-section opening to said outer annular cylindrical surface and a reduced portion of reduced transverse cross-section adjacent said inner annular cylindrical surface and opening to said flow passage, an outwardly facing annular shoulder intermediate said inner and outer annular cylindrical surfaces, and said relief plug has an external circumferential surface slightly larger than the inner circumferential surface of the enlarged portion of said port and is press fit within said enlarged port portion whereby said shoulder supports said relief plug against the fluid environment within the valve chamber prior to said fluid environment reaching a preselected pressure differential between said valve chamber and flow passage and is adapted to apply a shearing force on said relief plug in response to reaching said preselected pressure differential and as controlled by the size of the reduced transverse cross-section of the port.

* * * * *